July 9, 1940.                C. E. MAYNARD                2,207,101
                              TIRE TREAD
                          Filed May 14, 1936           2 Sheets-Sheet 1
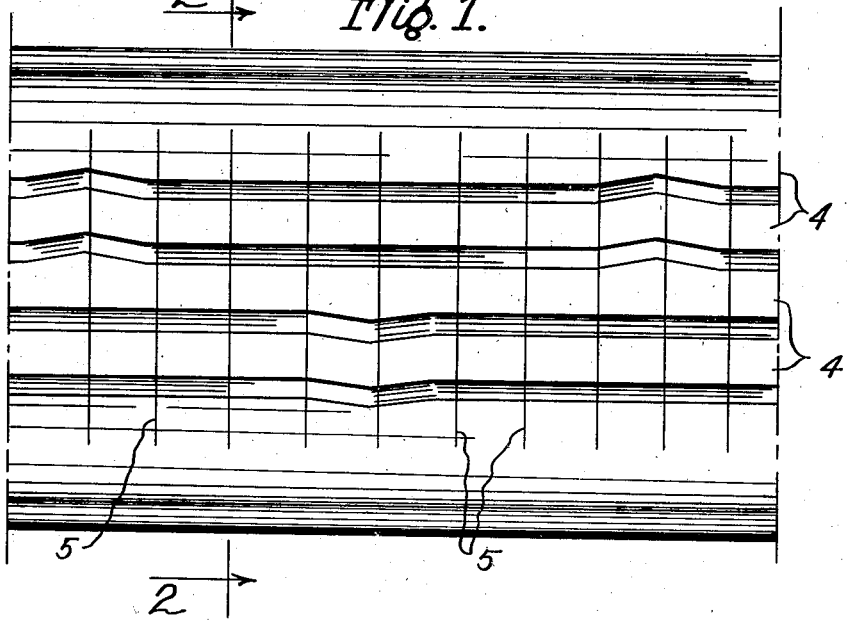
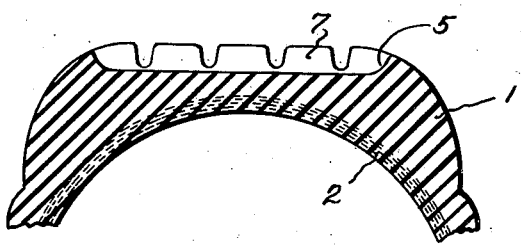
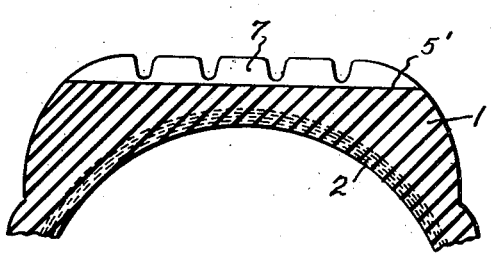
INVENTOR
CHARLES EDGAR MAYNARD
BY
Chapin & Neal
ATTORNEYS July 9, 1940.  C. E. MAYNARD  2,207,101
TIRE TREAD
Filed May 14, 1936  2 Sheets-Sheet 2
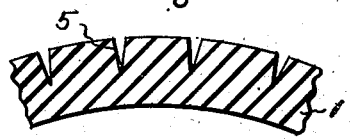
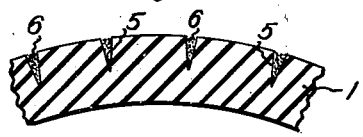
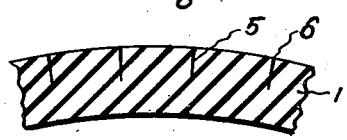
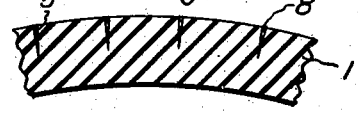
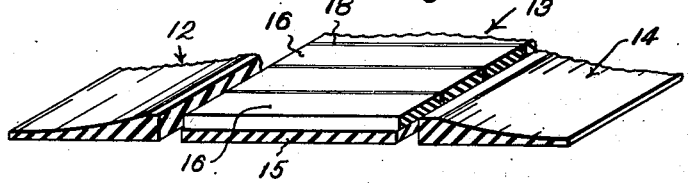
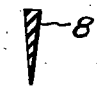
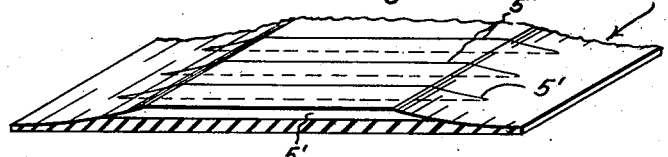
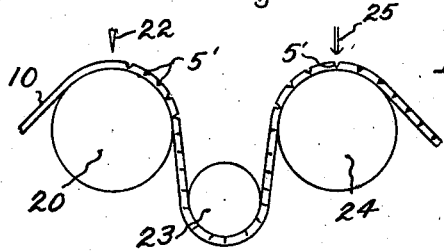
INVENTOR
CHARLES EDGAR MAYNARD
BY
Chapin & Neal
ATTORNEYS Patented July 9, 1940

2,207,101

UNITED STATES PATENT OFFICE 2,207,101

TIRE TREAD

Charles Edgar Maynard, Northampton, Mass., assignor, by mesne assignments, to United States Rubber Company, New York, N. Y., a corporation of New Jersey Application May 14, 1936, Serial No. 79,758

1 Claim. (Cl. 152—209)

This invention relates to rubber vehicle tires and their construction and more particularly to the tread portion of such tires.

It is one object of the invention to provide a tire tread which will resist skidding to a greater degree than will treads now commonly used and to accomplish this without substantial sacrifice of the wearing and other qualities desirable in a tire tread. A further object is to provide a method of constructing a tread of this character which assures greater uniformity in the product and secures economy in manufacture.

In the accompanying drawings which illustrate the invention—

Fig. 1 is a plan view of a portion of a tire tread made according to the invention;

Fig. 2 is a section taken substantially on line 2—2 of Fig. 1;

Fig. 3 is a view similar to Fig. 2 but showing a modification;

Figs. 4 and 5 are diagrammatic longitudinal sectional views showing the first two steps in the general method;

Figs. 6 and 7 are similar views showing one general form of procedure following the steps of Figs. 4 and 5;

Figs. 8 and 9 are similar views showing an alternative form of procedure following the steps of Figs. 4 and 5;

Figs. 10 and 11 are respectively sectional views of two forms of gum strip;

Fig. 12 is a perspective view of a tread strip embodying the invention;

Fig. 13 is a partly "exploded" perspective view of an alternative form of tread assembly; and Fig. 14 is a diagrammatic view of means for carrying out the method as a substantially continuous operation.

It will be understood that the drawings are not to scale and parts such as the thickness of the gum strips used and the width of the cut openings have been exaggerated for the sake of clearness.

It has previously been proposed, as a means of securing a non-skid tread, to mold and vulcanize the tread in the form of circumferential ribs and thereafter cut the ribs transversely to a depth approximately one-third of the depth of the ribs. This procedure is subject to a number of objections. Among these may be mentioned the fact that vulcanized rubber when cut is subject to chipping and tearing at the cut edges and there is a further tendency for the tread to crack at the bottom of the cuts. To minimize this tendency it has been necessary to limit the depth of cuts to approximately one-third of the depth of the rib, or other tread design element which may be used, with the result that the non-skid effect lasts only during one-third of the life of the tread. It is possible to subject the worn tread to a recutting operation, but this adds to the expense, and many purchasers rather than go to the bother of returning the tires for recutting will continue to run the tires with smooth ribs, with a consequent road hazard from skidding. A further objection lies in the fact that vulcanized rubber is difficult to cut and since the tire is complete at the time of the cutting operation, any imperfection or failure in the cutting results in the loss of the entire production cost of the tire.

As will be evident from the following specification, all of the above mentioned difficulties are overcome by my invention and many advantages obtained in improved operation, in quality, and uniformity of the product, and in manufacturing costs.

Referring to the drawings, 1 indicates generally the tread of a pneumatic tire, the tire carcass being conventionally indicated at 2 in Figs. 2 and 3. As shown, the tread design comprises circumferential ribs 4, but any suitable tread configuration may be used. The ribs and underlying portion of the tread are provided with a multiplicity of transverse cuts 5, see Figs. 1 and 2, which extend inwardly and downwardly from the tread shoulders. If preferred, the cuts may extend straight across through the shoulders, as indicated at 5' in Fig. 3.

According to my invention these cuts are formed in the tread portion of the tire, either before or after the tread is assembled on the carcass or after the carcass is expanded, but in any event before the tire is vulcanized. The cuts may be formed by means of any suitable knife. As will be later referred to, the knife may advantageously be heated or a heated wire may be used.

Referring to Figs. 4 to 9 inclusive, the cuts 5 having been made in the unvulcanized tread, the tread is flexed as shown in Fig. 5, to open the cuts. This flexing may be done as a separate manipulation before or after the tread is placed on the tire. When the tires are constructed flat or semi-flat, the expansion of the tire from flat or semi-flat band form to tire shape serves to flex the cuts open.

Figs. 6 and 8 illustrate two alternative procedures from this point. As illustrated in Fig. 6, I propose to fill the opened cut with a lubricating material such as powdered or liquid soapstone, as indicated at 6. When the flexing force is released, or partially released, see Fig. 7, sufficient soapstone is gripped and held in the cut to prevent joining of the sides of the cut during the subsequent vulcanizing. The tire casing is vulcanized under internal fluid pressure and the walls of the cuts are pressed closely together, with only a relatively thin film of lubricant between. As a result, a practically closed cleft with molded vulcanized sides is produced. The fact that all surfaces are "molded" vulcanized surfaces, as indicated at 7 in Figs. 2 and 3, instead of "cut" surfaces as in the prior practice, prevents chipping of the edges or splitting at the bottom so that the clefts may be carried, as shown, below the depth of the ribs so that the non-skid function of the clefts continues throughout the life of the tread.

A modified procedure, and in some ways the preferable one, is shown in Figs. 8 and 9. With the cuts 5 flexed open, as shown in Fig. 5, a strip of gum stock 8 is inserted in the cut. The gum stock may include sufficient pigment to give it a color the same as the tread or a contrasting color may be used. The gum strip may be rectangular in cross-section or may be given a cross-section such as shown at 8' and 8 in Figs. 10 and 11 respectively. Instead of gum stock, the cut may be filled with rubber cement, liquid latex, or a rubber dough, the essential feature being that the inserted rubber material shall be relatively soft, pliable, and deformable, as compared with the tread stock, when both have been vulcanized. It will be understood that the filler material bonds with the adjacent tread stock upon vulcanization but permits, because of the flexibility of the filler, relative movement between the blocks into which the "filled" clefts divide the ribs. In use the soft filler tends to wear faster than the tread and retreats as the tread wears, but the depth of the opened clefts so resulting is never great enough to afford lodgement to sand or stones. This freedom from the liability of picking up sand and stones comprises one important advantage of this form of my invention. A further advantage of this form is that the cutting and filling may be carried out as a continuous operation on a tread strip which is later cut to length in the usual manner for use in conventional building operations. Where a lubricant is used to form free walled clefts, as previously described, substantial care has to be used if the work is done on the tread in strip form to prevent lubricant coming in contact with the under side of the tread strip where its presence might prevent proper adhesion of the tread to the carcass. This danger is not present when the cuts are filled with gum or the like.

In Fig. 12 a tread strip 10 is shown in flat form, the cuts being shown at 5'. Fig. 13 shows one manner in which a tread strip may be built up to include gum strips which do not extend through the shoulders. Referring to the latter figure, the tread strip as it comes from the calendar or tuber is cut longitudinally into three strips indicated respectively at 12, 13, and 14, the cuts being made inside the shoulders. The central strip 13 is then cut in a horizontal plane to form a continuous base strip 15, while the upper portion is cut to form separate oblong blocks 16. The blocks 16 are separated to receive gum strips 18, after which the parts are reassembled and secured together in any suitable manner, as by gassing the surfaces or coating them with cement, to permit the strip to be handled as a unit.

Fig. 14 discloses diagrammatically one way of carrying out a continuous cutting and filling of a tread strip. As there shown, the tread strip 10 is guided around a roll 20, thus tensioning the outer surface. As it passes over and is bent around roll 20 a knife 22 cuts the strip to the desired depth to form cuts 5'. The strip then passes beneath a guide roll 23 and over a roll 24 which is of sufficiently small diameter to flex the strip and open the cuts 5' for the reception of the filler or a lubricating material, as indicated at 25.

The use of a heated knife or wire as a means for making the cuts has been mentioned above. The immediate effect of the heated knife or cutter is to soften the rubber and, if the gum strips are immediately inserted, bonding of the tread and gum stock surfaces is facilitated. The use of such cutting means may also be employed advantageously when it is desired to form open clefts, since the heat of the knife or wire has a tendency to start a superficial vulcanization if given time and opportunity, especially where high speed accelerators are used, thus aiding whatever lubricant is used in preventing adhesion of the walls of the clefts during subsequent vulcanization. The tendency of the sulphur in the rubber compound to bloom on the surface of the cuts also aids in preventing adhesion of the walls. If the cut treads are permitted to age, even for a comparatively short period before being vulcanized, the tendency of adhesion of the walls is lessened.

The cuts or clefts may be equally spaced about the circumference of the tire but preferably an unequal spacing is used to afford quiet operation.

It will be seen that whether the zones of separation between the independently acting portions of the ribs are constituted by open clefts or integral insets of soft rubber material, these zones are congenital with the tire tread and are, therefore, part of the tire as the latter is taken from the vulcanizing mold.

While the invention has been described as applied to a pneumatic tire, it may also be employed in the construction of solid or cushion tires.

I claim:

A tire having the tread formed with cuts which impart to the tire anti-skidding properties, the opposed faces of said cuts being in substantial contact and characterized by molded surfaces imparted by the presence of a lubricating substance in the cuts during vulcanization.

CHARLES EDGAR MAYNARD.